United States Patent [19]

Maehara

[11] Patent Number: 5,098,172
[45] Date of Patent: Mar. 24, 1992

[54] HYDRAULIC BRAKE PRESSURE GENERATION APPARATUS FOR A VEHICLE

[75] Inventor: Toshifumi Maehara, Saitama, Japan

[73] Assignees: Akebono Brake Industry Co., Ltd., Tokyo; Akebono Research and Development Centre Ltd., Saitama, both of Japan

[21] Appl. No.: 579,663

[22] Filed: Sep. 10, 1990

[30] Foreign Application Priority Data

Sep. 28, 1989 [JP] Japan .................. 1-250740

[51] Int. Cl.⁵ .................................. B60T 8/32
[52] U.S. Cl. .................. 303/114 R; 188/358; 303/52; 303/116 R; 303/119 R
[58] Field of Search ........... 303/113, 114, 116, 119, 303/50–56, 10–12, 114 R, 114 PB, 113 R, 133 TR, 113 TB, 116 R, 116 SP, 119 R; 188/358, 359, 345; 60/547.1, 545; 91/368, 374, 376 R

[56] References Cited

U.S. PATENT DOCUMENTS

| | | | |
|---|---|---|---|
| 3,237,411 | 3/1966 | Taft | 188/359 X |
| 3,870,377 | 3/1975 | Belart et al. | 303/114 |
| 3,979,153 | 9/1976 | Ingram et al. | 303/114 X |
| 4,828,333 | 5/1989 | Reinartz et al. | 60/547.1 X |
| 4,867,509 | 9/1989 | Maehara et al. | |
| 4,952,003 | 8/1990 | Okubo | 303/119 |

FOREIGN PATENT DOCUMENTS 2169975 7/1986 United Kingdom .

Primary Examiner—Douglas C. Butler
Attorney, Agent, or Firm—Finnegan, Henderson, Farabow, Garrette, and Dunner

[57] ABSTRACT

A hydraulic brake pressure generation apparatus which is provided with a pressure increasing valve apparatus, a fluid pressure increasing apparatus and a power valve. The pressure increasing valve apparatus receives a fluid pressure in a fluid pressure chamber of a master cylinder and then generates a fluid pressure the force of which is larger by a predetermined amount than the fluid pressure in the fluid pressure chamber.

4 Claims, 6 Drawing Sheets

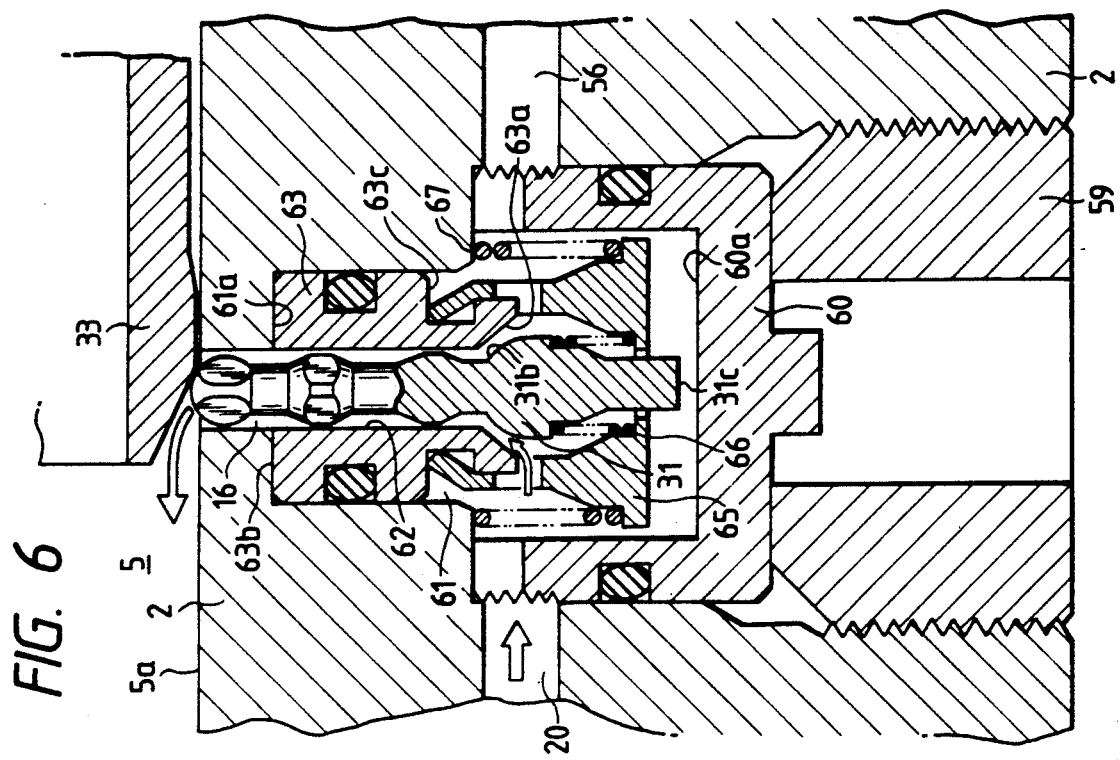
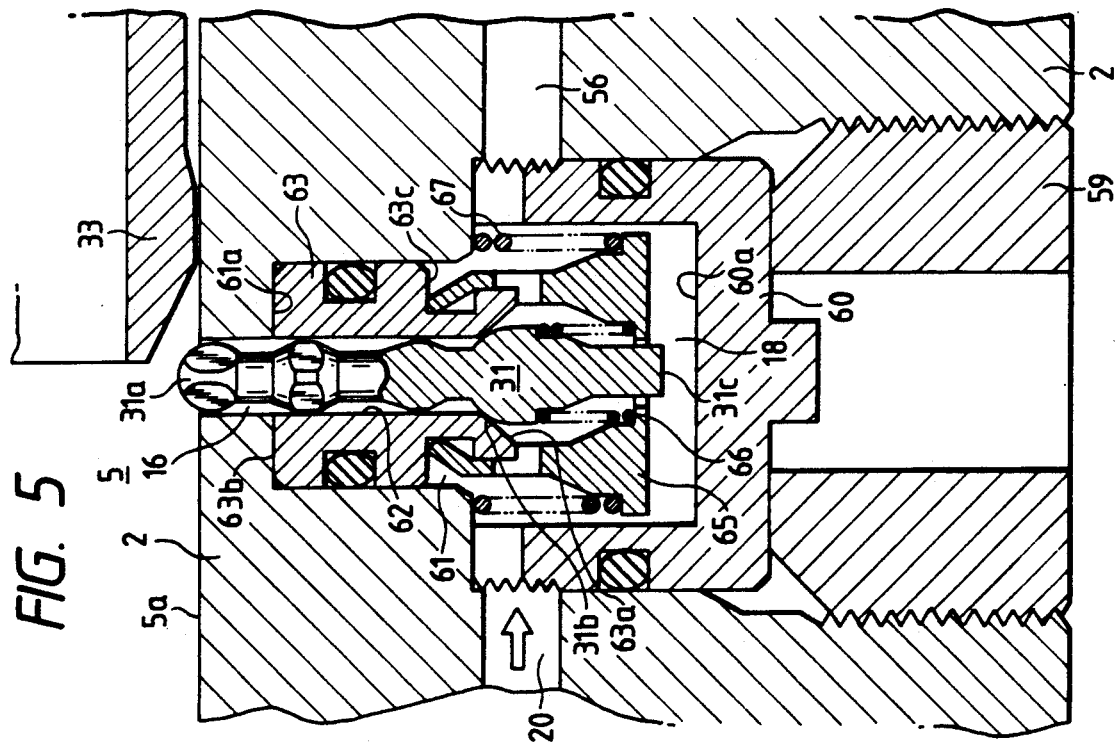

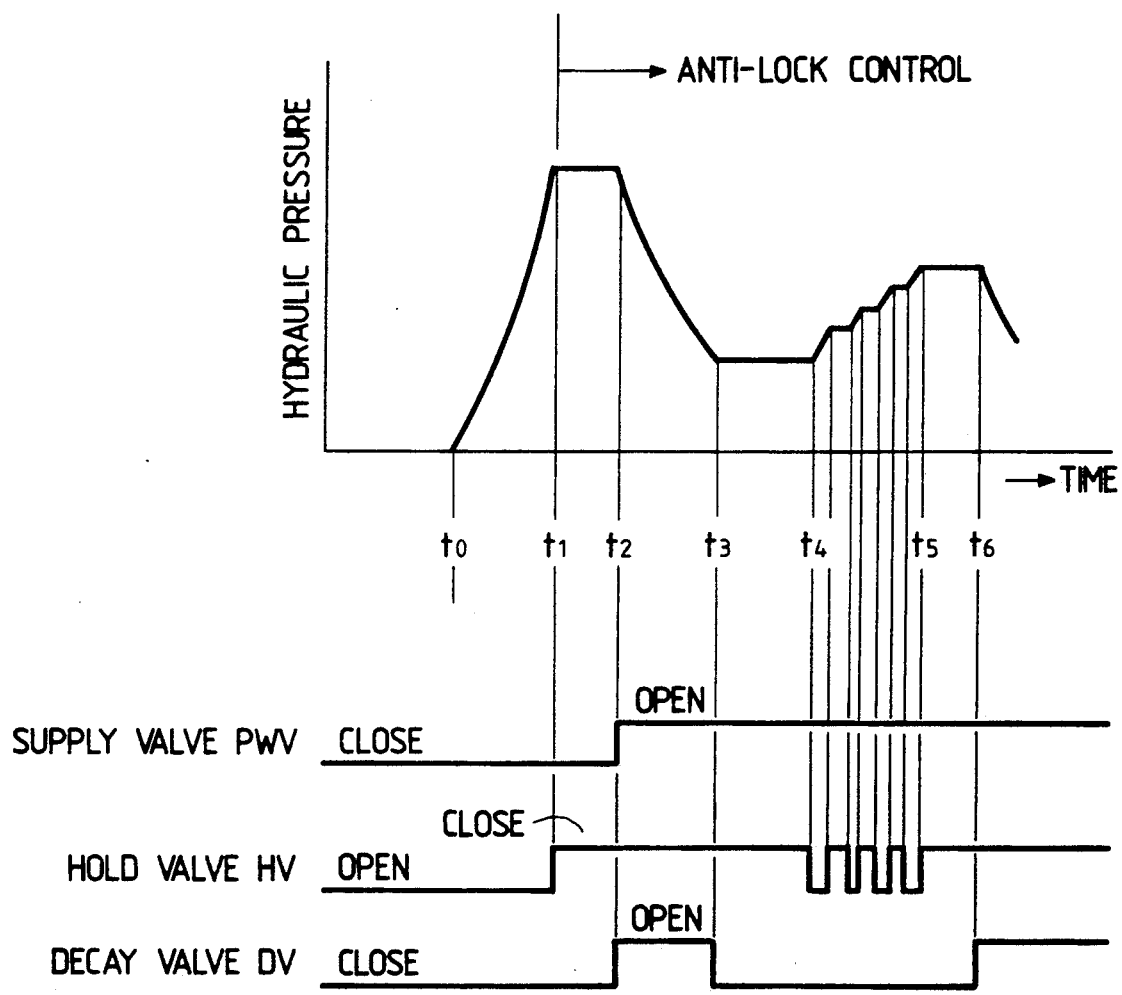

HYDRAULIC BRAKE PRESSURE GENERATION APPARATUS FOR A VEHICLE

BACKGROUND OF THE INVENTION

1. Field of the Invention

The present invention relates to a hydraulic brake pressure generation apparatus for a vehicle capable of increasing a depressing force applied to a brake pedal while the vehicle brakes.

2. Description of the Related Art

Generally, a conventional hydraulic brake pressure control apparatus is provided with two pistons for controlling fluid pressure of a brake apparatus having two brake systems. The apparatus is also provided with two fluid pressure chambers and wheel cylinders fluid pressure in which is controlled by the two pistons, and the fluid pressure chambers and the wheel cylinders are connected therewith by a fluid passage. The pistons are engaged with the brake pedal through a vacuum booster which is a force increasing apparatus utilizing negative pressure of the vehicle engine.

In the apparatus described above, when the brake pedal is depressed down, the vacuum booster generates a force which is several times as strong as that applied to the brake pedal, and the force of the vacuum booster is applied to the pistons thereby supplying the fluid pressure in the fluid pressure chamber of a master cylinder to the wheel cylinders, so that the braking force is applied to the vehicle wheels.

However, the vacuum booster is large in size which occupies largely a small limited space of the engine room. On the other hand, it is known to provide another apparatus utilizing fluid pressure for braking the vehicle wheels. However, a responsibility of the operation is not so good at an initial time of the operation due to a sliding resistance of the pistons.

SUMMARY OF THE INVENTION

Accordingly, it is an object of the present invention to provide a hydraulic brake pressure generation apparatus which requires no vacuum booster but generates a sufficient force which is substantially the same as that of the conventional vacuum booster.

It is another object of the invention to provide a hydraulic brake pressure generation apparatus improved in responsibility of the operation even at an initial time of the operation.

The above object of the invention can be achieved by a provision of a hydraulic brake pressure generation apparatus which, according to the invention, is provided with a pressure increasing valve apparatus, a fluid pressure increasing apparatus and a power valve.

The pressure increasing valve apparatus receives a fluid pressure in a fluid pressure chamber of a master cylinder and then generates a fluid pressure the force of which is larger by a predetermined amount of force than the fluid pressure in the fluid pressure chamber.

The fluid pressure increasing apparatus includes a push rod engaged with the brake pedal and a power piston provided between the master cylinder and the pistons. The power piston is actuated by both the push rod and the fluid pressure supplied by the pressure increasing valve apparatus to thereby increase the depressing force applied to the brake pedal.

The power valve is provided in a fluid passage connecting between the pressure increasing valve apparatus and the fluid pressure increasing apparatus. The power valve shuts the fluid passage before the power piston of the fluid pressure increasing apparatus is actuated by the push rod to thereby prevent the fluid pressure generated by the pressure increasing valve apparatus from being supplied to the power piston.

Other objects and features of the present invention will become apparent from the following detailed description considered in connection with the accompanying drawings. It is to be understood, however, that the drawings are designed as an illustration only and not as a definition of the limits of the invention.

BRIEF DESCRIPTION OF THE DRAWINGS

FIGS. 5 and 6 are sectional views showing an operation of the valve mechanism shown in FIG. 2;

FIG. 9 is a timing chart explaining the anti-lock control operation of the apparatus shown in FIG. 1.

DESCRIPTION OF THE PREFERRED EMBODIMENTS

Preferred embodiments of the present invention will now be described in detail with reference to accompanying drawings.

Figure 1:
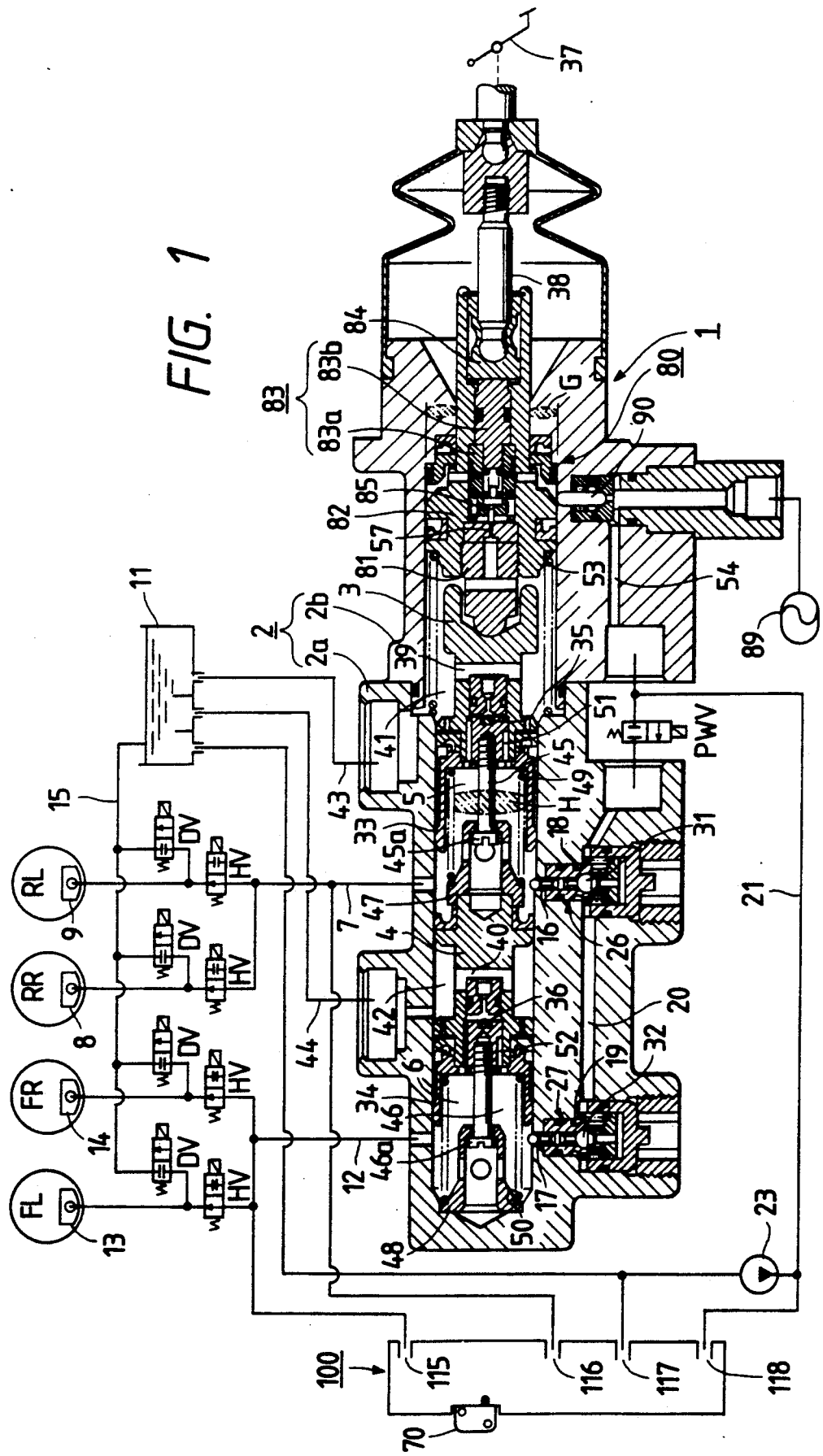
FIG. 1 is a sectional view showing a hydraulic brake pressure generation apparatus according to an embodiment of the present invention.

FIG. 1 is a sectional plan view showing a hydraulic brake pressure generation apparatus having anti-lock control function for a vehicle having two braking system according to an embodiment of the invention.

A tandem type master cylinder 1 has a housing 2 in which a primary piston 3 and secondary piston 4 are disposed. A fluid pressure chambers 5 and 6 are formed inside the housing 2, and pressures of the chambers 5 and 6 are controlled by the primary and secondary pistons 3 and 4, respectively.

The fluid pressure chamber 5 controlled by the primary piston 3 is communicated with a wheel cylinder 8 of the rear-right wheel RR and a wheel cylinder 9 of the rear-left wheel RL through a fluid passage 7 in which a hold valve HV of a normally-open type solenoid valve is provided.

Similarly, the fluid pressure chamber 6 is communicated with a wheel cylinder 13 of the front-left wheel FL and a wheel cylinder 14 of the front-right wheel FR through a fluid passage 12 in which a hold valve HV of the normally-open type solenoid valve is provided. The wheel cylinders 8, 9, 13 and 14 are communicated with a reservoir 11 through a fluid passage 15 in which a decay valve DV of the normally-closed type solenoid valve is provided.

Inside the housing member 2a of the master cylinder 1, there are provided valve chambers 18 and 19 having openings 16 and 17 which are communicated with the fluid pressure chambers 5 and 6, respectively. The valve chambers 18 and 19 are communicated with each other through a fluid passage 20 provided in the housing member 2a. The valve chamber 19 is communicated with an ejection side of a fluid pressure pump 23 through a fluid passage 21 in which a supply valve PWV of a normally-closed type solenoid valve is disposed. A suction side of the fluid pressure pump 23 is connected to a reservoir 11. The valve chambers 18 and 19 accommodate therein valve mechanisms 26 and 27 (described below) having intake valves 31 and 32 acting also as check valves, respectively.

A fluid pressure increasing apparatus 80 is provided inside a housing member 2b connected to the housing member 2a at a rear side (right side in FIG. 1) thereof. The fluid pressure increasing apparatus 80 is provided with a booster rod 81 positioned in a right side opening of the primary piston 3, a cylindrical power piston 82 fixed to a right end of the booster rod 81, and a reaction piston 83 consisting of two parts 83a and 83b which are provided coaxially with the power piston 82 and move slidably therein. The power piston 82 is provided between the push rod 38 engaged with the brake pedal 37 and the primary piston 3 of the master cylinder 1. The power piston 82 is actuated by both the push rod 38 and the fluid pressure supplied to the fluid passage 21 thereby increasing the depressing force applied to the brake pedal 37.

Figure 7:
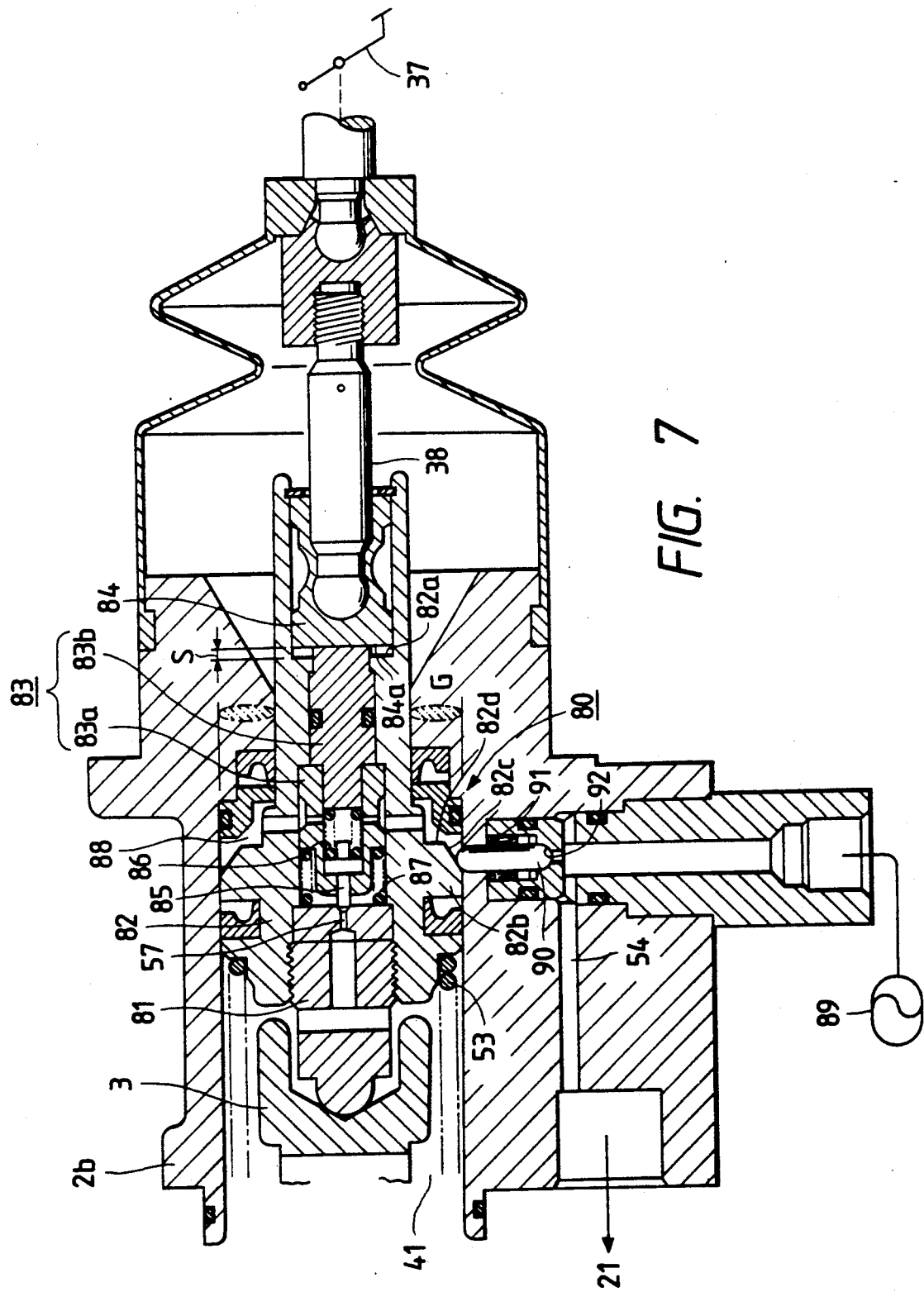
FIGS. 7 and 8 show enlarged views of essential parts of the apparatus shown in FIG. 1.

FIG. 7 is an enlarged sectional view showing the fluid pressure increasing apparatus 80. The reaction piston 83 accommodates therein a valve 85 which is movable in the axial direction of the master Cylinder 1 and urged toward the booster rod 81 side by a valve spring 86. At a right side of the booster rod 81, there is provided a fluid passage 57 communicating with the reservoir 11 so that the valve 85 shuts the fluid passage 57 when the reaction piston 83 moves leftward in the figure.

At the right end of the reaction piston part 83b, there is provided a rod piston 84 which moves leftward in the figure together with the push rod 38 engaged with the brake pedal 37 by an actuation of the brake pedal 37. The power piston 82 has an engaging step 82a at an inner surface thereof which is spaced apart from the left side end surface 84a of the rod piston 84 by a gap S while the brake pedal 37 is not depressed down. The engaging step 82a is always urged opposite direction toward the left side end surface 84a by a spring 87 disposed between the reaction piston 83 and the booster rod 81.

The housing part 2b of the master cylinder 1 has a large inner diameter part which opens to the housing part 2a and accommodates a large diameter part 82b of the power piston 82. At an outer right end of the large diameter part 82b of the power piston 82, there is provided an inclined engaging surface part 82c which engages with a power valve 90 described later, which valve is disposed at a lower side in the housing part 2b. The large diameter part 82b is provided with an annular pressure receiving step 82d including the inclined engaging surface part 82c which step receives a fluid pressure. A servo chamber 88 is disposed at a right side of the pressure receiving step 82d.

A fluid passage 54 is provided in the housing part 2b of the master cylinder 1 for communicating between the fluid passage 21 and the servo chamber 88, and the power valve 90 is disposed in an opening of the fluid passage 54 which opens to the servo chamber 88. The fluid passage 54 also communicates with a small-sized accumulator 89. The power valve 90 is urged against the valve seat 92 by an elastic force of a spring 91. During the condition shown in FIGS. 1 and 7 where the brake pedal 37 is not depressed and the rod piston 84 does not urge the power piston 82, the inclined engaging surface part 82c of the power piston 80 engages with the end of the power valve 90 by the return spring 53 disposed between the right end of the housing part 2a and the power piston 82 so that the power valve 90 is pressed downwardly to engage with the valve seat 92. In this condition, the power valve 90 shuts the fluid passage 54 to prevent the fluid pressure stored in the accumulator 89 while the brake pedal 37 is not depressed from flowing to the reservoir 11 through the servo chamber 88 and the fluid passage 57.

When the brake pedal 37 is depressed down to thereby actuate the rod piston 84 and move the power piston 82 to the left as shown in the figures, the inclined engaging part 82c of the power piston 82 disengages from the power valve 90. In this condition, the valve 90 is urged upwardly by the fluid pressure in the fluid passage 54 and disengages from the valve seat 92. Accordingly, the fluid pressure in the fluid passage 54 is supplied to the servo chamber 88 through the opening.

Cylindrical intake sleeves 33 and 34 facing the fluid pressure chambers 5 and 6 for actuating the intake valves 31 and 32 are fixed to the primary and secondary pistons 3 and 4, respectively. The primary and secondary pistons 3 and 4 house therein center valves 35 and 36, respectively, which are movable along the longitudinal axis of the master cylinder relative to the primary and secondary pistons 3 and 4, respectively.

While a brake pedal 37 is not depressed down and, therefore, the rod piston 84 fitted on the push rod 38 connected to the brake pedal 37 does not push the primary piston 3 through the power piston 82 as shown in FIG. 1, the fluid pressure chamber 5 is communicated with the reservoir 11 through the center valve 35 which opens, a communicating passage 39 in the primary piston 3, an annular chamber 41 formed at periphery of the pistons 3, and a fluid passage 43. In this condition, similarly, the fluid pressure chamber 6 is communicated with the reservoir 11 through the center valve 36 which opens, a communicating passage 40 in the secondary piston 4, an annular chamber 42 formed at periphery of the piston 4, and a fluid passage 44. The servo chamber 88 shown in FIG. 7 communicates with the fluid passage 54 through the power valve 90 provided in the housing part 2b and also communicates with the reservoir 11 through the fluid passage 57.

When the brake pedal 37 is depressed down, the push rod 38 is actuated to urge the rod piston 84. Therefore, as is apparent from FIG. 7, the rod piston 84 moves leftwardly with compressing the spring 87 through the reaction piston 83, and the valve 85 shuts the fluid passage 57 to thereby shut the fluid communication between the servo chamber 88 and the reservoir 11. Then, the left end surface 84a of the rod piston 84 comes into abutment against the annular engaging step 82a of the power piston 82. In this condition, when the brake pedal 37 is further depressed down, the power piston 82, the booster rod 81 fixed to the power piston 82 at the left end thereof and the primary piston 3 contacting to the booster rod 81 move leftwardly in FIG. 1 together with the rod piston 84.

If the brake pedal 37 is depressed down by the vehicle driver, the push rod 38 is actuated thereby moving the primary piston 3 leftwardly in the figure, the center valve 35 is closed to thereby prevent the fluid pressure chamber 5 from hydraulically communicating with the reservoir 11. Accordingly, the pressure inside of the fluid pressure chamber 5 increases and, therefore, the brake fluid in the fluid pressure chamber 5 is supplied to the wheel cylinders 8 and 9 through the hold valve HV which opens. As a result, the wheels RR and RL of the rear brake system are subject with the braking operation. The increase of the pressure in the fluid pressure chamber 5 causes the actuation of the secondary piston 4 so that the center valve 36 is closed thereby preventing the fluid pressure chamber 6 from hydraulically communicating with the reservoir 11. As a result, the fluid pressure in the fluid pressure chamber 6 also increases and, therefore, the brake fluid in the chamber 6 is supplied to the wheel cylinders 13 and 14 through the hold valve HV which opens so that the wheels FL and FR of the front brake system are subject with the braking operation.

Such positional relationship and operation among the members described above are achieved by stop bolts 45 and 46 the center valves 35 and 36 are provided at an end thereof, respectively, stop bushings 47 and 48 engaged with heads 45a and 46a of the stop bolts 45 and 46, respectively, springs 49 and 50 compressedly disposed between the stop bushings 47 and 48 and the intake sleeves 33 and 34, respectively, and springs 51 and 52 always urging the center valves 35 and 36 toward their closed position.

Figure 8:
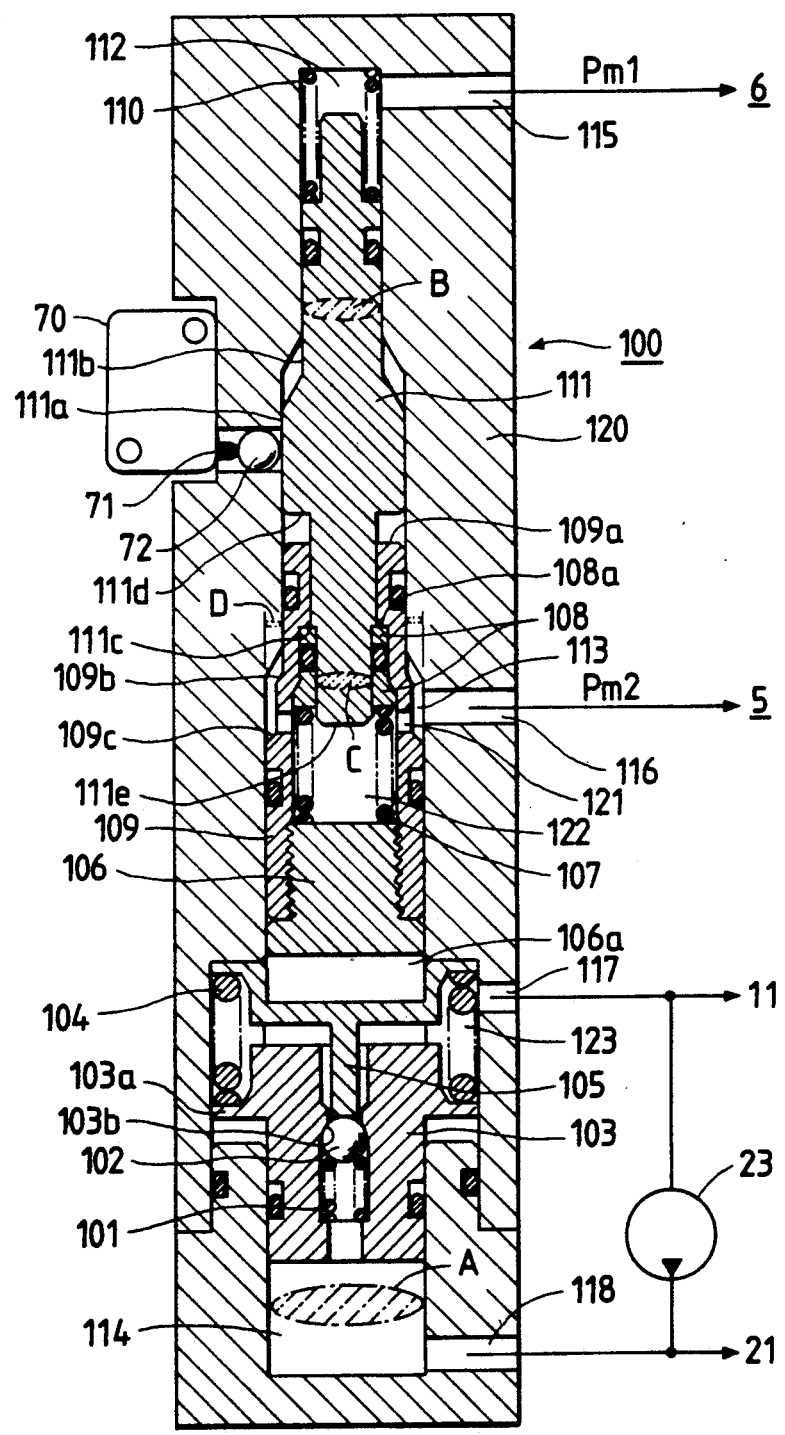

FIG. 8 is a sectional view showing a pressure increasing valve apparatus 100. The pressure increasing valve apparatus 100 is provided with a casing 120 which accommodates a first piston 103 providing therein a valve spring 101 and a ball valve 102, a relief spring 104 urging the first piston 103 downwardly, a valve rod 105 protruded into the first piston 103 for opening the ball valve 102, a second piston 106 positioned adjacent to the upper end of the first piston 103 and moving with the first piston 103, a sleeve 109 having a cylindrical stepped part fixed to the second piston 106 and accommodating therein a spring 107 and a seal stopper ring 108, and a plunger 111 slidably movable in the casing 120 coaxially with respect to both the sleeve 109 and the inner surface of the casing and being urged downwardly by a spring 110.

The relief spring 104 is provided compressedly between a spring seat 103a of the first piston 103 and a part of the valve rod 105. The valve rod 105 is mounted in a groove 106a formed on the second piston 106 in order not to obstruct the movement of the first and second pistons 103 and 106.

A switch 70 consisting of microswitch is provided on a part of the casing 120 of the pressure increasing valve apparatus 100. The switch 70 operates to disconnect an electrical flow to a motor which actuates the fluid pressure pump 23 when an actuator 71 of the switch 70 is actuated by a large diameter part 111a of the plunger 111 through a ball 72 and connect the electrical flow to the motor when the actuator 71 falls in a small diameter part 111b to thereby actuate the fluid pressure pump 23.

The casing 120 is provided with four ports 115, 116, 117 and 118. A fluid chamber 112 communicates with the fluid chamber 6 of the master cylinder 1 through the port 115. A fluid chamber 113 formed along the periphery of the stepped sleeve 109 and a fluid chamber 122 provided below the plunger 111 which chamber is communicated with the fluid chamber 113 through a fluid passage 121 are communicated with the fluid chamber 5 of the master cylinder 1 through the port 116. A chamber 123 in which the relief spring 104 is fitted is communicated with the reservoir 11 through the port 117. A chamber 114 formed below the first piston 103 communicates with the fluid passage 21 through the port 118.

The operation of the pressure increasing valve apparatus 100 will be described hereinbelow.

The fluid pressure in the fluid chambers 5 and 6 of the master cylinder 1 increases in accordance with the depression of the brake pedal 37. A fluid pressure Pm1 generated in the fluid pressure chamber 6 is supplied into the fluid chamber 112 formed in the plunger 111 through the fluid passage 12 and the port 115 thereby pressing the plunger 111 downwardly (the operating area of this action is now designated by B). When an engaging step 111c of the plunger 111 comes into abutment against an upper end surface 108a of the seal stopper ring 108 and moves the plunger 111 downwardly further together with the seal stopper ring 108, an engaging step 111d of the plunger 111 comes into contact to an upper end surface 109a of the stepped sleeve 109 facing the step 111d and presses the stepped sleeve 109 downwardly.

On the other hand, a fluid pressure Pm2 generated in the fluid chamber 5 of the master cylinder 1 is supplied to the fluid chambers 113 and 122 in the middle portion of the pressure increasing valve apparatus 100 to act on a lower end surface 111e of the plunger 111 so that the plunger 111 is urged upwardly. Here, the operation area is now designated by C. The fluid pressure Pm2 acts on the two stepped part 109b and 109c formed on the outer periphery of the stepped sleeve 109 to thereby urge the stepped sleeve 109 downwardly (the operation area of this action is now designated by D). Since the stepped sleeve 109 is fixed to the second piston 106, the stepped sleeve 109 moves together with the first and second pistons 103 and 106. When the stroke of the plunger moving downward reaches a predetermined distance, the actuator 71 of the switch 70 falls in the outer surface 111b of the small diameter part of the plunger 111, so that the fluid pressure pump 23 is actuated and, therefore, the ejected fluid pressure P acts in the fluid chamber 114 through the port 118.

When the hydraulic brake pressure in the fluid passage 21 increases in response to the actuation of the fluid pressure pump 23, the first piston 103 moves upwardly with compressing the relief spring 104 (the operation area of this operation is designated by A). When the first piston 103 moves upwardly further, the valve rod 105 comes into contact to the ball valve 102 to thereby disengage the ball valve 102 from the valve seat 103b, so that the fluid pressure in the fluid passage 21 is discharged to the reservoir through the port 117 to thereby prevent an undesired excessive pressure from being generated in the fluid passage 21.

The relationship among the operation areas A, B, C and D, fluid pressure Pm1 and Pm2, and the output pressure P of the fluid pressure pump 23 while the fluid pressure acting on the first piston 103 has a good balance will be expressed the following equation (1), if a setting road of the relief spring 104 is designated by F;

$$Pm1 \cdot B + Pm2 \cdot D + F = P \cdot A + Pm2 \cdot C \tag{1}$$

where $A = B + D - C$.

Now assuming that $Pm1 = Pm2 = Pm$, and $P = Pm + \Delta P$, the following equation (2) can be obtained;

$$\Delta P = F/A \tag{2}$$

That is, the pressure increasing valve apparatus 100 generates an output pressure P which is higher by the predetermined pressure $\Delta P$ ($=F/A$) than the input pressure Pm ($=Pm1=Pm2$).

In case that the left side of the equation (1) is smaller than the right side thereof, the ball valve 102 disengages from the valve seat 103b and the piston chamber 114 communicates with the reservoir 11 and, as a result, the output pressure P decreases. On the other hand, if the left side of the equation (1) is larger than the right side thereof, the ball valve 102 abuts against the valve seat 103b, and the output pressure increases by the actuation of the fluid pressure pump 23. Thus, while the pressure increasing valve apparatus 100 operates, the output pressure P is applied into the fluid passage 21 which pressure is higher by the predetermined amount $\Delta P$ than the input pressure Pm by repeating the engagement and disengagement between the ball valve 102 and the valve seat 103b.

The construction and operation of the valve mechanisms 26 and 27 will now be described.

Figure 2:
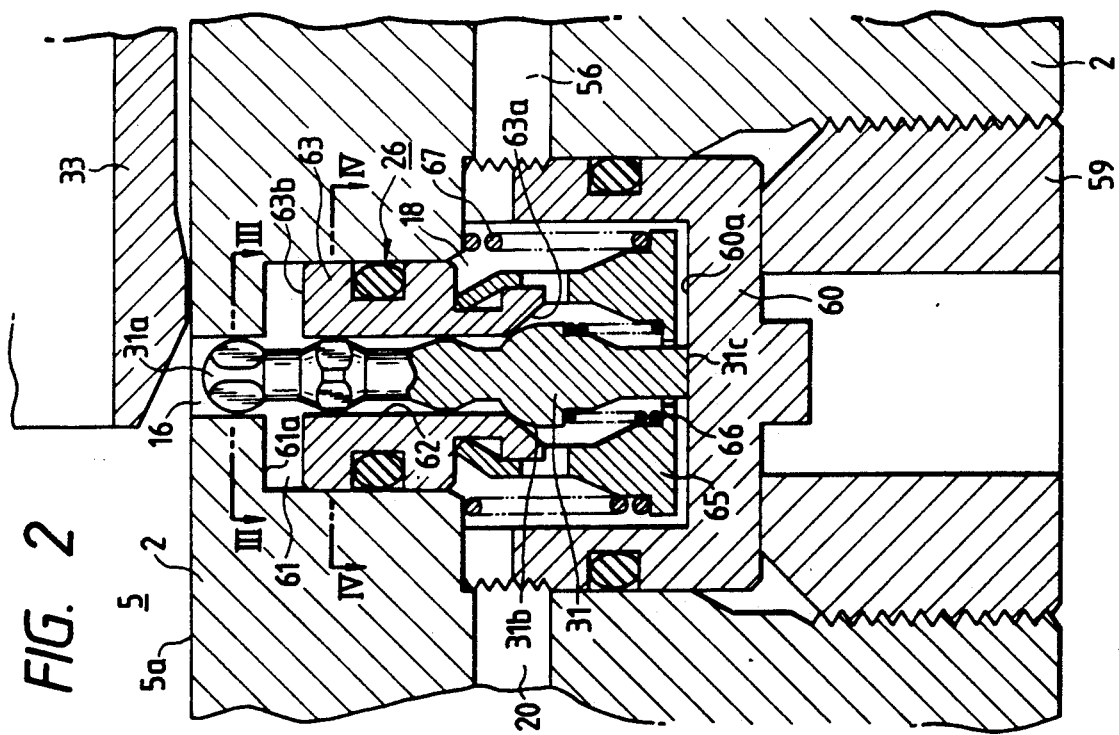
FIG. 2 is an enlarged sectional view showing a valve mechanism of the apparatus shown in FIG. 1.

FIG. 2 is an enlarged sectional view showing the valve mechanisms 26 where it is assumed that no fluid pressure is supplied into the fluid passage 20. The valve chamber 18 is formed by a cup-shaped plug 60 secured in the housing 2 by a set bolt 59. The valve chamber 18 is provided with an opening part 16 opening to the fluid pressure chamber 5 and a piston chamber 61 positioned beside the opening part 16 on the common axis therewith. In the piston chamber 61, there is provided a piston 63 having a center hole 62 and acting as a valve holding member. The piston 63 is slidable on an axis which is perpendicular to an inner surface 5a of the fluid pressure chamber 5. A conical valve seat 63a is formed at an end portion opposite to the opening part 16 of the center hole 62.

Figure 3:
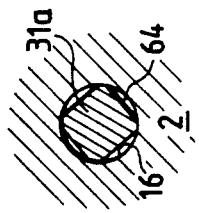
FIGS. 3 and 4 show an intake valve cut in lines III and IV, respectively, in FIG. 2.
Figure 4:
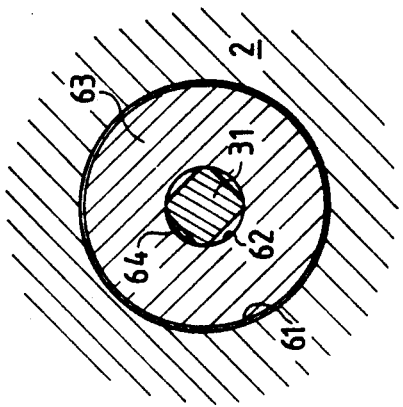

An intake valve 31 consisting of a stick-like poppet valve is disposed slidably in the opening part 16 of the valve chamber 18 and center hole 62 of the piston 63. The intake valve 31 is provided with a head 31a which protrudes into the fluid pressure chamber 5 and extracts into the piston chamber 61 in accordance with the sliding of the intake valve 31. The intake valve is further provided with a semi-spherical valve member 31b abuttable against the valve seat 63a of the piston 63. The head 31a and a part 31d of spindle portion of the piston 31 are rectangular shaped in cross section as shown in FIGS. 3 and 4. Corners of the rectangular portions of the head 31a and the part 31d of the spindle portion of the piston 31 act as supports which always contact to inner peripheral walls of the opening part 16 of the valve chamber 18 and the center hole 62 of the piston 63, respectively, so that the intake valve 31 smoothly slides in the opening part 16 and the center hole 62 without any irregular movement when the intake valve 31 is retracted by the intake sleeve 33. The rectangular portions of the head 31a and the part 31d form passages along outer periphery of the intake valve 31 through which the brake fluid passes.

A spring holder 65 is unitary connected to the piston 63. A check spring 66 is compressedly disposed between the spring holder 65 and the intake valve 31 so that the valve member 31b of the intake valve 31 is always urged against the valve seat 63a of the piston 63 with a predetermined check force. The piston 63 is always urged in a direction opposite the opening part 16 by a set spring 67 compressedly disposed between the spring holder 65 and a wall of the valve chamber 18. The elastic force of the set spring 67 is larger than that of the check spring 66, so that a base end 31c of the intake valve 31 is held in contact with an inner wall 60a of the plug 60 by the elastic force of the set spring 67 as shown in FIG. 2. The elastic force of the set spring 67 also acts between the valve seat 63a of the piston 63 and valve member 31b of the intake valve 31.

According to the embodiment of the invention, the fluid pressure pump 23 is not actuated during no braking condition. In this condition, however, the fluid passage 54 in which the small accumulator 89 is provided is connected through the supply valve PWV, the brake fluid of the output pressure P of the pressure increasing valve apparatus 100 is supplied to the fluid passage 20 connecting between the valve chamber 18 and 19 while the supply valve PWV opens during the anti-lock control operation, and the fluid pressure stored in the accumulator 89 is supplied to the valve chambers 18 and 19 while the supply valve PWV closes during no braking condition. Therefore, as shown in FIG. 5, the fluid pressure is applied to the end surface 63c of the piston 63 so that the piston 63 moves toward the opening 16 side against an elastic force of the set spring 67 while the intake valve 31 is kept being abutted to the valve seat 63a by an elastic force of the check spring 66, and the end surface 63b of the piston 63 contacts to a wall surface 61a of the piston chamber 61. In this condition, the head 31a of the intake valve 31 keeps protruding from the opening 16.

During the normal braking operation or anti-lock control operation, the valve mechanism 26 keeps the condition shown in FIG. 5 until the stroke of the primary piston 3 reaches the predetermined distance and the intake sleeve 33 comes into engagement with the head 31a of the intake valve 31.

On the other hand, when the primary piston 3 moves leftwardly in FIG. 1 and the stroke of the piston reaches the predetermined distance, the intake sleeve 33 comes into contact to the head 31a of the intake valve 31 and the intake valve 31 is pressed down against the elastic force of the check spring 66 as shown in FIG. 6. As a result, the valve member 31b disengages from the valve seat 63a of the piston 63. In this condition, if the fluid pressure in the fluid passage 21 is highly pressurized, the brake fluid is introduced into the fluid chamber 5.

The operation of the fluid pressure increasing apparatus 80 will be described. When the brake pedal 37 is depressed down, first, the power valve opens to thereby the brake fluid stored in the accumulator 89 is applied to the power piston 82 and the depressing force applied to the brake pedal 37 is transmitted to the primary piston 3 through the push rod 38, rod piston 84, reaction piston 83, power piston 82 and the booster rod 81, so that the fluid pressures Pm1 and Pm2 in the fluid chambers 5 and 6, respectively, increase. As a result, the fluid pressure in the fluid chambers 112 and 113 of the pressure increasing valve apparatus 100 also increases. Then, since the plunger 111 and the stepped sleeve 109 moves downwardly to turn the switch 70 on, the fluid pump 23 is actuated to thereby generate the output pressure P which is higher than the input pressure Pm ($=Pm1=Pm2$)of the apparatus 100 by $\Delta P$, so that the highly pressurized fluid is introduced into the servo chamber 88 which is shut out of the reservoir 11 by the valve 85. Now, the fluid pressure operation area of the power piston 82 designates G, that of the primary piston 3 designates H, and the fluid pressure received by the power piston 82 designates P. The fluid pressure generated in the fluid pressure chambers 5 and 6, that is, the input pressure Pm of the pressure increasing apparatus 100 can be determined by an equation (3) below;

$$Pm=(G/H)\cdot P \text{ (where } G<H) \tag{3}$$

Keeping the relationship expressed by the foregoing equation (3), the fluid pressure is transmitted from the fluid pressure increasing apparatus 80 to the pressure increasing valve apparatus 100 or from the pressure increasing valve apparatus 100 to the fluid pressure increasing apparatus 80. Thus, the fluid pressure circulates until the Pm reaches a changing point. During the increasing of the input pressure Pm, the depressing force applied to the brake pedal 37 does not act on the power piston 82. When the input pressure Pm reaches the changing point, the input pressure Pm stops increasing and, accordingly, the depressing force to the brake pedal 37 starts to act on the power piston 82 to thereby further increase the input pressure Pm. As a result, the output pressure P of the pressure increasing valve apparatus 100 increases furthermore so that the higher pressure is supplied to the servo chamber 88. Thus, the required brake pressure increasing is obtained.

The accumulator 89 connected to the fluid passage 54 maintains the required pressure until the pump 23 is actuated in the initial operation of the pressure increasing apparatus 80 so that the improved responsibility is kept. The capacity of the accumulator 89 is set at an amount which is necessary until the center valve 35 closes.

The operation of the hydraulic brake pressure generation apparatus shown in FIG. 1 will be described with reference to FIG. 9.

FIG. 9 is a timing chart showing the change in fluid pressure during the normal braking operation and the subsequent anti-lock control operation together with the open/close operations of the hold valves HV and decay valves DV. Actually, each of the two brake systems is independently controlled. However, the operation will be described below assuming that both the systems are simultaneously controlled.

(A) Normal braking operation ($t_0$ to $t_1$ in FIG. 9)

While the hold valve HV opens, decay valves DV closes as shown in FIG. 1, when the brake pedal 37 is depressed down, the primary piston 3 is urged by the booster rod 81 to move leftward in FIG. 1 and, accordingly, the secondary piston 4 moves leftwardly to thereby close the center valve 36. By this operation, the fluid chambers 5 and 6 generate a highly pressurized fluid by the fluid pressure increasing apparatus 80 which fluid is supplied to the wheel cylinders 8, 9, 13 and 14 so that the braking operation is achieved.

(B) Anti-lock control operation

While the fluid pressure in the wheel cylinders 8, 9, 13 and 14 increase, if a wheel speed (wheel speed of the wheel of each of the brake systems to be controlled, e.g. wheel speed of the front-right wheel FR and front-left wheel FL under select low) rapidly decelerates to reach a predetermined decelerating amount at a time point $t_1$, a control circuit (not shown) comprising a microcomputer generates a hold signal and, therefore, an anti-lock control starts from the point $t_1$.

(1) Holding Mode ($t_1$ to $t_2$ in FIG. 9)

At the time point $t_1$, the hold valve HV closes and, therefore, both the fluid passage 12 communicating to the wheel cylinders 8 and 9 and the fluid passage 14 to the wheel cylinders 13 and 14 are closed to thereby keep the fluid pressure in the wheel cylinders 8, 9, 13 and 14 as they are.

In this operation, the valve mechanisms 26 and 27 are in the condition shown in FIG. 5 where the head 31a and 32a of the intake valves 31 and 32 protrude in the fluid pressure chambers 5 and 6, respectively. If the intake sleeves 33 and 34 are positioned to press the intake valves 31 and 32 down, respectively, the valve mechanisms 26 and 27 are in the condition shown in FIG. 6 in which the hydraulic pressure which is highly pressurized by the fluid pump 23 is introduced into the fluid pressure chambers 5 and 6 through the fluid passages 21 and 20, respectively. By this fluid pressure, the pistons 3 and 4 are moved back to a position where the intake sleeves 33 and 34 disengage from the intake valves 31 and 32, respectively, and the fluid pressure in the fluid pressure chambers 5 and 6 are in proportion to the depressing force applied to the brake pedal 37. That is, in accordance with the position of the primary and secondary pistons 3 and 4, the intake sleeves 33 and 34 press the intake valves 31 and 32 down, respectively, to thereby communicate the fluid pressure chambers 5 and 6 with the ejection port of the fluid pressure pump 23. By the fluid pressure ejected by the fluid pump 23, the pistons 3 and 4 are moved back until the intake valves 31 and 32 close the openings 16 and 17, respectively. Therefore, if a sudden default is occurred in the fluid pressure source system, a sufficient fluid pressure can be maintained in the fluid pressure chambers 5 and 6.

(2) Pressure decreasing Mode ($t_2$ to $t_3$)

When the system speed decreases further, the decay valve DV opens at a time point $t_2$ so that the fluid pressure in the wheel cylinders 8, 9, 13 and 14 is discharged to the reservoir 11 through the fluid passages 10 and 15. Thus, the pressure in the wheel cylinders decreases.

(3) Holding Mode ($t_3$ to $t_4$)

At a time point $t_3$ at which the system speed starts to restore its speed after a low peak point by means of decreasing the brake fluid pressure, the decay valve DV closes to be in a holding mode again.

(4) Pressure increasing Mode ($t_4$ to $t_5$)

When the system speed reaches the high peak point, the hold valves HV open to move the pistons 3 and 4 and to open the intake valves 31 and 32 so that the fluid pressure is supplied from the fluid pressure pump 23 to the wheel cylinders 8, 9, 13 and 14 through the fluid pressure chambers 5 and 6. In the pressure increasing mode starting from a time point $t_4$, the hold valve HV opens and close at small intervals and, accordingly, the brake fluid pressure increases step by step.

(5) Holding Mode ($t_5$ to $t_6$)

The system speed starts to decrease by means of increasing the brake fluid pressure to be in a holding mode in which the hold valve HV closes. Then, at a time point $t_6$, the decay valves DV to be again in the pressure decreasing mode.

As is apparent from the description above, since a hydraulic brake pressure generation apparatus for a vehicle according to the present invention employs the fluid pressure increasing apparatus 80 capable of generating a force which is substantially the same as that of the conventional vacuum booster, any large size and expensive vacuum booster is no longer required. Particularly, a combination of the integrated master cylinder 1 and the fluid pressure increasing apparatus 80 of the invention would cause a hydraulic brake fluid increasing apparatus which is small in size and low in manufacturing cost. Further, the power source of the hydraulic pressure increasing apparatus 80 can commonly be used to that of the master cylinder 1 of the integrated type, which is very convenient.

Further, according to the present invention, the fluid pressure which is higher than that in the fluid pressure chambers 5 and 6 of the master cylinder 1 by a predetermined amount of pressure is supplied to the fluid passage 21 by the pressure increasing valve apparatus 100, the fluid pressure to be applied to the fluid passage 21 can automatically be determined in accordance with the fluid pressure generated in the master cylinder 1, and the open/close valve of the fluid pressure increasing apparatus 80 is acted merely by the valve 85 provided in the power piston 82. Therefore, the apparatus can be made simple in structure.

Furthermore, according to the invention, since the power piston 82 does not receive any fluid pressure during no braking operation and, therefore, the sliding resistance of the power piston 82 is small in the initial time of the operation, the undesired excessive depressing force to the brake pedal is effectively prevented. That is, a relatively light force to the brake pedal will actuate the operation.

What is claimed is:

1. An apparatus for controlling brake fluid pressure of a vehicle having a brake pedal to which brake actuating force may be applied, comprising:
   a master cylinder comprising a housing having therein at least one fluid pressure chamber, and at least one piston movably mounted within said housing, said housing having a valve chamber which opens to said fluid pressure chamber;
   a fluid pressure source for supplying brake fluid;
   a push rod connected to the brake pedal of the vehicle;
   a reservoir for holding the brake fluid;
   a wheel cylinder for applying a braking force to a vehicle wheel;
   a first fluid passage communicating said fluid pressure chamber with said wheel cylinder;
   a hold valve provided in said first fluid passage so as to control fluid communication between said fluid pressure chamber and said wheel cylinder;
   a second fluid passage communicating said wheel cylinder with said reservoir;
   a decay valve provided in said second fluid passage so as to control fluid communication between said wheel cylinder and said reservoir;
   a third fluid passage connecting said fluid pressure source to said fluid pressure chamber of said master cylinder;
   at least one intake valve mounted in said fluid pressure chamber and normally held in a closed position to shut off said third fluid passage;
   a valve operating member mounted on said piston for moving therewith, said valve operating member being engageable with said intake valve when movement of said at least one piston reaches a predetermined value to thereby move said intake valve to an open position;
   a pressure increasing valve means for generating a fluid pressure which is higher by a predetermined amount than fluid pressure in said master cylinder;
   a fluid pressure increasing means having a power piston provided between said push rod and said at least one piston of said master cylinder for increasing force applied to the brake pedal, said fluid pressure increasing means being actuated both by said push rod and fluid pressure generated by said pressure increasing valve means; and
   a power valve, provided in a fourth fluid passage connected between said pressure increasing valve means and said fluid pressure increasing means, for shutting said fourth fluid passage thereby preventing fluid pressure generated by said pressure increasing valve means from being supplied to said power piston.

2. The apparatus of claim 1, wherein said valve chamber has an opening which opens to said fluid pressure chamber, one end of said intake valve being received in said opening, said intake valve having a valve portion, there being provided a valve piston mounted within said valve chamber and having a valve seat at one end of said valve piston remote from said opening, said intake valve being movable relative to said valve piston, a first spring having a bias for urging said valve seat into sealing engagement with said valve portion to shut off said third fluid passage, said valve piston being movable together with said intake valve between a first position where said one end of said intake valve is fully received in said opening and a second position where said one end of said intake valve projects into said fluid pressure chamber; said valve piston being held in said firs position during its normal closed condition; said valve piston being moved by fluid pressure, supplied from said fluid pressure source, to said second position against the bias of said first spring when fluid pressure increases in said third fluid passage; and in said second position of said valve piston, said valve operating member being engageable with said one end of said intake valve to move said intake valve relative to said valve piston to thereby disengage said valve portion of said intake valve from said valve seat of said valve piston to communicate said fluid pressure source with said fluid pressure chamber through said third passage.

3. The apparatus of claim 1, wherein said valve operating member comprises a sleeve having an outer periphery, a longitudinal axis, and opposite ends, said sleeve being movable along the longitudinal axis thereof and having one of the opposite ends held against said at least one piston, said sleeve having an inclined surface formed at the outer periphery at the other of said opposite ends, said inclined surface being converging toward the longitudinal axis of said sleeve, said inclined surface being engageable with one end of said intake valve projecting into said fluid pressure chamber.

4. The apparatus of claim 1, wherein said pressure increasing valve means comprises:
   a casing;
   a first piston in said casing, said first piston having an upper end and receiving therein a valve spring and a ball valve;
   a relief spring urging said first piston downwardly;
   a valve rod protruded into said first piston for opening said ball valve;
   a second piston positioned adjacent to the upper end of said first piston and moving with said first piston;
   a sleeve having a cylindrical stepped part fixed to said second piston and receiving therein a spring and a seal stopper ring; and
   a plunger slidably movable in said casing coaxially with respect to both said sleeve and the inner surface of said casing, and being urged downwardly by a spring.

* * * * *

UNITED STATES PATENT AND TRADEMARK OFFICE
CERTIFICATE OF CORRECTION

PATENT NO. : 5,098,172

DATED : March 24, 1992

INVENTOR(S) : Toshifumi Maehara

It is certified that error appears in the above-identified patent and that said Letters Patent is hereby corrected as shown below:

On the Title page, under "Foreign Patent Documents,

Column 2, line 13, "Attorney, Agent, or Firm", change "Garrette" to --Garrett--.

Claim 2, column 12, line 25, change "firs" to --first--.

Signed and Sealed this

Seventeenth Day of August, 1993

*Attest:*

BRUCE LEHMAN

*Attesting Officer*     *Commissioner of Patents and Trademarks*